Nov. 8, 1932.  H. O. LINDGREN  1,887,315
ELASTIC BEARING FOR SEPARATORS
Filed March 9, 1929

WITNESS:
Rob R Kitchel

INVENTOR
Hans Olof Lindgren
BY
Busser and Harding
ATTORNEYS.

Patented Nov. 8, 1932

1,887,315

UNITED STATES PATENT OFFICE

HANS OLOF LINDGREN, OF APPELVIKEN, SWEDEN, ASSIGNOR TO THE DE LAVAL SEPARATOR COMPANY, OF NEW YORK, N. Y., A CORPORATION OF NEW JERSEY

ELASTIC BEARING FOR SEPARATORS

Application filed March 9, 1929, Serial No. 345,663, and in Sweden March 15, 1928.

In many centrifugal machines, such as separators, it is customary to have the bowl-supporting shaft turn in an elastic bearing in order to avoid too heavy vibrations when the center of gravity of the bowl lies outside the center line of the shaft. These bearings usually are so constructed that the bush or bearing surrounding the shaft is supported by one or more springs arranged in the frame of the machine. The properties of these springs must be adapted to the size of the separator, so that, when the bowl exceeds the critical speed, the elastic force will become sufficiently great to prevent too heavy vibrations. On the other hand, the elastic force must not be so great as to transmit too strong vibrations to the frame when the separator bowl is rotating at normal speed. Experience has shown that the bearings used for stationary separators are not suitable for centrifuges mounted on a moving support, for example, on board ships in heavy sea. In order to prevent too great vibration of the separator bowl in such installations, it would be desirable to have a spring system in which the elastic forces rapidly increase with magnitude of deflection. This would, however, entail the difficulty that, as above stated, unnecessarily heavy vibrations would arise in the separator when the movements of the support are small.

The present invention comprises an elastic bearing in which the spring system has such properties that a strong increase of the elastic force is reached as soon as the vibration of the bowl becomes greater than is normal with machines mounted on a stationary support. The bearing is acted upon by two sets of springs, one relatively weak and one relatively strong, the weaker of which is constantly working upon the bearing, whereas the stronger mainly acts upon the bearing when it is displaced from its middle or normal position more than is normally the case with machines mounted on a stationary support.

In the drawing, which shows preferred embodiments of my invention—

Figure 1:
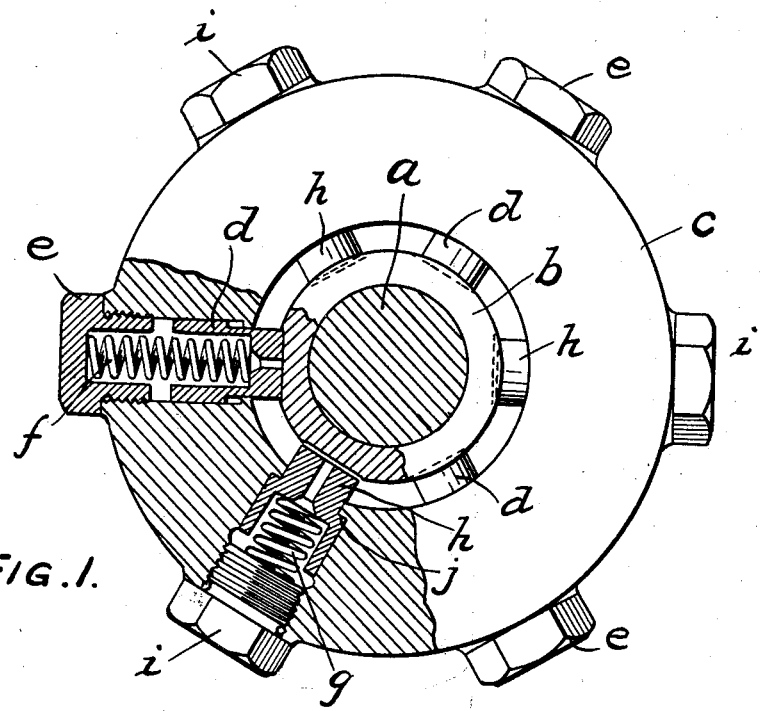
Fig. 1 is a view, partly in plan and partly in cross-section, of one embodiment of the invention.

Referring, first, to the construction shown in Fig. 1: The shaft $a$ of a centrifugal separator bowl is surrounded by a bearing $b$. In a part $c$ supported by, or forming part of, the frame of the centrifugal machine, and surrounding and spaced from bearing $b$, are a number of radial recesses within which are radially slidable buffers $d$. Screw plugs $e$ close the outer ends of these recesses. Springs $f$ are confined between these plugs and the inner end heads of buffers $d$ and constantly press the buffers against bearing $b$.

In the frame $c$ are formed other radial recesses, in which are radially slidable buffers $h$, between the inner end heads of which and screw plugs $i$ closing the outer ends of the recesses are confined springs $g$. Springs $g$ tend to press buffers $h$ against bearing $b$, but complementary shoulders $j$ on buffers $h$ and frame $c$ hold buffers $h$ out of contact with and spaced from bearing $b$ when the latter is in its normal central position or is only slightly displaced therefrom.

The properties of the springs $f$, which constantly work upon the bearing, are those which are desirable in a spring system for use in centrifugal machines mounted on a stationary support; that is, they are relatively weak. Springs $g$ are relatively strong and are ineffective to resist radial displacement of the bearing until the amplitude of such displacement exceeds that which normally occurs with centrifuges mounted on a stationary support. When the bearing has been so far displaced from its normal position that it contacts with any one of the buffers $h$, the elastic forces yieldingly resisting further displacement of the bearing considerably increase, whereby too great deflection of the bowl is prevented.

Figures 2, 3:
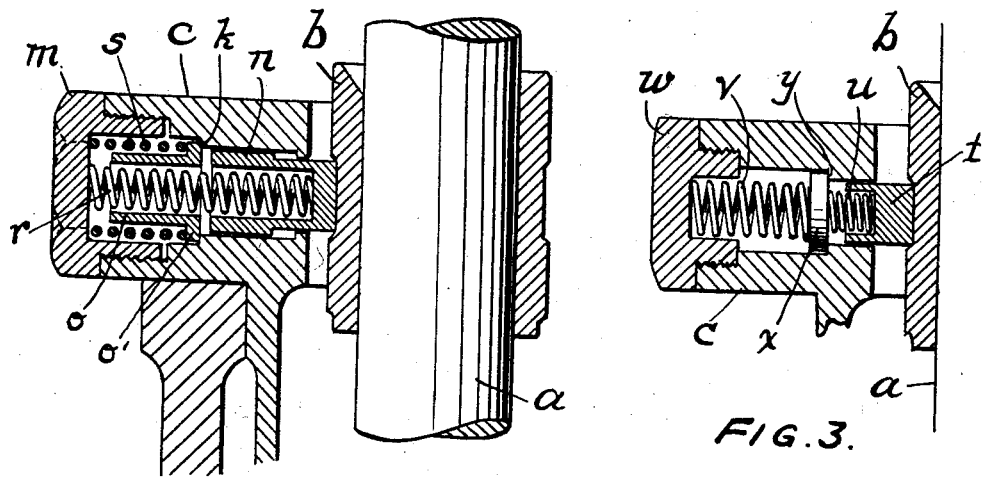
Fig. 2 is a sectional elevation of another embodiment of the invention.
Fig. 3 is a cross-sectional view of another embodiment of the invention.

Referring, next, to the construction shown in Fig. 2: In the part $c$ supported by, or forming part of, the machine frame, and surrounding and spaced from bearing $b$, are a number of radial recesses, closed by screw plugs $m$, in the inner end of each of which recesses is slidable a buffer n and in the outer end a buffer o. A comparatively weak spring r is confined between the plug m and the inner end head of buffer n and constantly presses buffer n against the bearing. A comparatively strong spring s is confined between plug m and a flange o' on the buffer o. Buffer o is adapted to be engaged by buffer n when the outward displacement of the bearing exceeds a predetermined amplitude. By means of an annular shoulder or stop k on frame c, buffer o is restrained from moving inward and is thereby held spaced from buffer n when the latter is in its normal position and until its displacement exceeds a predetermined amplitude, whereupon buffer n contacts with buffer o, and spring s is rendered operative and acts to substantially increase the elastic force resisting further displacement of the bearing.

In Fig. 3, as in Fig. 2, a relatively weak spring u and a relatively strong spring v are confined between a buffer t that contacts with bearing b and a screw plug w closing the outer end of the recess. Spring v is positioned back of spring u and the two springs may be separated by a buffer which normally contacts with a stop y. The inner spring u is of such character that its coils completley close when the deflection of bearing b reaches a predetermined amplitude, after which spring u acts, as a solid body, to compress spring v, thereby setting up a strong increase of the elastic forces tending to resist further displacement.

It is to be understood that the embodiments of my invention shown are merely examples of the practical application of my invention, which is susceptible of embodiment in other specific constructions.

I am aware that it is known to provide springs adapted to centrifugal separator bearings, which increase their resistance at a rate exceeding the amplitude of the movement of the shaft and bearing. Such springs are disclosed in the Leitch Patents 1,352,204, September 7, 1920, and No. 1,373,084, March 29, 1921. In the present invention, however, one spring system is depended on, mainly or wholly, to take care of small displacements that may be considered as normal for a separator mounted on a stationary foundation, while the other, and preferably a substantially stronger, spring system does not substantially start functioning until the deflection exceeds what may be considered as normal for a separator mounted on a stationary foundation.

What I claim is:

1. An elastic bearing structure for centrifuges comprising an annular bearing adapted to surround the shaft of the centrifuge, a series of relatively weak compression springs extending along different radii of the bearing and in continuous operative engagement therewith and adapted to yieldingly resist bearing displacements of relatively small amplitude, a series of relatively strong springs also arranged along different radii of the bearing and means to hold each strong spring in compression but out of operative relation with the bearing during said relatively small displacements thereof and until the displacement exceeds a predetermined amplitude and to then allow that strong spring, which is in line of displacement of the bearing, to, by reason of its being held in compression, offer a sudden substantially increased resistance to displacement beyond said predetermined amplitude.

2. An elastic bearing structure for centrifuges comprising an annular bearing adapted to enclose the shaft of the centrifuge, a frame surrounding the bearing and provided with radial recesses open at their inner ends, buffers slidable in said radial recesses, relatively weak springs pressing the buffers against the bearing and adapted to yieldingly resist relatively small bearing displacements, stops on said frame, other buffers slidable in radial recesses behind said stops, heads closing the outer ends of said radial recesses, relatively strong springs held in compression back of said other buffers and pressing the latter said stops, each stop thus holding the corresponding strong spring in inoperative position until the displacement of the bearing toward such spring exceeds a predetermined amplitude.

In testimony of which invention, I have hereunto set my hand, at Stockholm, Sweden, on this 20th day of February, 1929.

HANS OLOF LINDGREN.